United States Patent [19]

Jaudt

[11] 4,165,822

[45] Aug. 28, 1979

[54] BUCKET WHEEL SLUICE HAVING PRESSURIZED DISCHARGE

[76] Inventor: Andreas Jaudt, Schongauerstrasse 10 c, D-8900 Augsburg, Fed. Rep. of Germany

[21] Appl. No.: 895,180

[22] Filed: Apr. 10, 1978

[30] Foreign Application Priority Data

Jul. 16, 1977 [DE] Fed. Rep. of Germany ....... 2732199

[51] Int. Cl.² ............................................ B65G 53/46
[52] U.S. Cl. ...................................... 222/636; 406/67
[58] Field of Search .......................... 302/49; 222/194; 214/17 B

[56] References Cited

U.S. PATENT DOCUMENTS

| | | | |
|---|---|---|---|
| 1,777,043 | 9/1930 | Lanhoffer et al. | 222/194 |
| 2,644,724 | 7/1953 | Kronstad | 302/49 |

FOREIGN PATENT DOCUMENTS

1015094 12/1965 United Kingdom ...................... 302/49

Primary Examiner—Jeffrey V. Nase

Attorney, Agent, or Firm—Pollock, Vande Sande and Priddy

[57] ABSTRACT

A bucket wheel sluice comprises a housing having an inlet, an outlet, and a sluice wheel mounted for rotation therebetween. The wheel includes a plurality of elongated vanes extending parallel to the axis of rotation of the wheel, with the roots of said vanes being freely spaced from one another. An elastic sealing device, such as a length of resilient tubing, is located within the wheel in resilient engagement with the roots of said vanes to cover the spaces between the roots of adjacent ones of the vanes and cooperates with the vanes to provide a plurality of pockets around the wheel which receive material at the housing inlet and deliver it to the housing outlet as the wheel rotates. A stationary duct connected to a compressed air supply is interposed between the roots of the vanes and the elastic sealing device adjacent the housing outlet, and the duct includes air discharge apertures facing the roots of the vanes for forcibly expelling material from the region between the vanes at the housing outlet.

14 Claims, 2 Drawing Figures

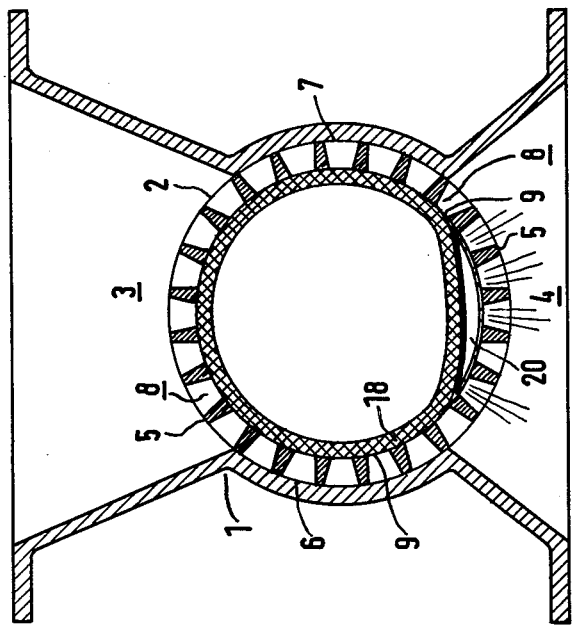
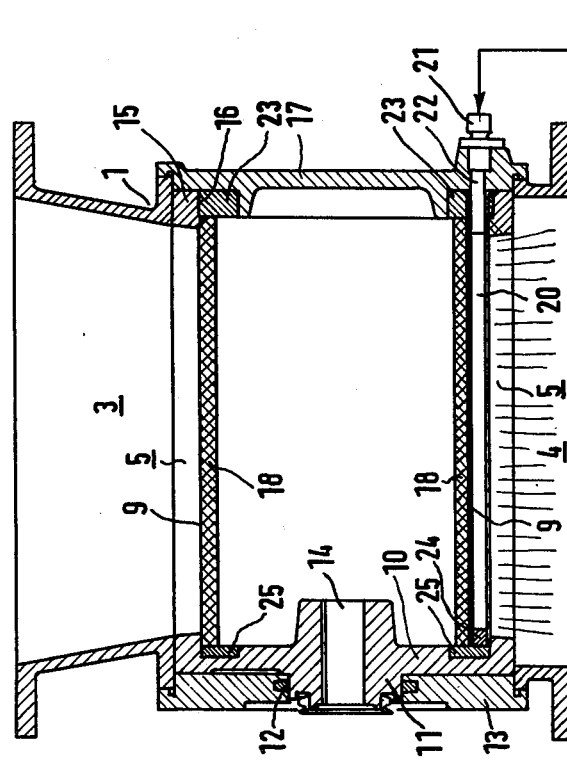

BUCKET WHEEL SLUICE HAVING PRESSURIZED DISCHARGE

BACKGROUND OF THE INVENTION

The present invention relates to an improved bucket wheel sluice comprising a rotatable wheel device which includes a plurality of outstanding vanes forming pockets for the transport of material from a housing inlet to a housing outlet, and so arranged that the pockets may be pneumatically pressurized at a position adjacent the housing outlet to forcibly expel material out of the pockets.

Bucket wheel sluices have been suggested heretofore which are provided, near the center of the sluice wheel, with a compressed air pipe that has an elongated slot oriented toward the housing outlet, and extending over the entire length of the wheel pockets in the bucket wheel. The compressed air pipe normally has a circular profile and is rigidly connected to the housing, and the sluice wheel revolves around said compressed air pipe with the vanes of the wheel being affixed by bolts to rotary supporting discs located at opposing ends of the wheel. These discs, bolts, and vanes all rotate about the compressed air pipe, the inner ends or roots of the vanes being in sliding contact with the compressed air pipe, and the outer tips of the vanes gliding tightly across the substantially opposed walls of the housing.

Known constructions of the type described above are relatively costly, particularly since the vanes must be wedge-shaped and of an elastic nature in order to ensure that they achieve a proper seal with the compressed air pipe at their root ends and a proper seal relative to the housing walls at their tip ends. Moreover, such known devices exhibit the further disadvantage that the pockets are generally of comparatively large size due to the type of construction which is employed and, since the pockets do not possess a V-shaped profile due to the specific shape of the vanes employed in this known device, a complete blow-out of the wheel pockets is not always assured especially if the material therein constitutes bulk goods that normally exhibit handling problems. Further, in view of the sealing problems which are mentioned above, only a limited pressure difference can be achieved between the intake and discharge size of the known bucket wheel sluice.

The principal object of the present invention is to provide a bucket wheel sluice of significantly different construction wherein, notwithstanding the comparative simplicity of the construction employed, much greater pressure differences between the intake and outlet side of the sluice become feasible, and a complete blowing-out of the wheel pockets is assured even when the pockets are transporting bulk goods having handling problems.

SUMMARY OF THE INVENTION

A bucket wheel sluice constructed in accordance with the present invention comprises a housing defining an inlet portion and an outlet portion which are separated from one another by curved walls of circular segmental configuration which partially bound a chamber of cylindrical, or partially cylindrical, configuration located within said housing between the inlet and outlet portions thereof. A cylindrical sluice wheel is mounted for rotation within the chamber in coaxial relation to the aforementioned walls. The sluice wheel comprises a pair of rotatable members, e.g. a disc-shaped member at one end of the wheel and an annular bearing member at its other end, which are located adjacent the opposing ends of the chamber respectively an coaxial relation to the walls; and a plurality of elongated parallel vanes extend between the rotatable members in parallel relation to the axis of rotation of the sluice wheel.

The tips of the vanes are located for tight gliding movement past the curved walls of the housing, and past the inlet and outlet portions of the housing, as the sluice wheel rotates. The roots of the vanes are freely spaced from one another between said rotatable members, and an elastic tubular member, having an outer diameter which is equal to or greater than the inner diameter of the sluice wheel at the vane roots, is located between the aforementioned rotatable members in coaxial relation to the sluice wheel and is positioned and dimensioned to resiliently engage the roots of the vanes so as to bridge the spaces between adjacent ones of said vanes at their roots. As a result, each adjacent pair of said vanes, and the intervening portion of the elastic tubular member, form a pocket for the reception of material at the inlet portion of the housing and for transport of that material to the outlet portion of the housing.

Pneumatic means are provided adjacent the outlet portion of the housing for forcibly expelling material from the aforementioned pockets. These pneumatic means comprise an elongated stationary duct which extends substantially parallel to the axis of rotation of the sluice wheel adjacent the outlet portion of the housing, and which is interposed between the elastic tubular member and the roots of the vanes. To accommodate this positioning of the duct, the tubular member flexes radially away from the vanes as it passes over the side of the duct remote from the outlet portion of the housing. The duct has a circularly segmental shape defined by one partially circular wall which conforms to the path of movement of the roots of the vanes adjacent the outlet portion of the housing, and an opposed wall of lesser curvature which is engaged by the tubular member. The edges of said duct joining these two walls are of comparatively narrow width to facilitate flexing of the tubular member away from the roots of the vanes as it engages one edge of the duct, and to facilitate smooth flexible return of the elastic tubular member into engagement with the roots of the vanes as it leaves the other edge of said duct.

The duct wall which is directly adjacent to the roots of the vanes includes a plurality of apertures facing the outlet portion of the housing. One end of the duct, between the aforementioned curved walls thereof, is closed by a plug, and the other end of the duct is provided with a fitting for attaching the duct to a compressed air supply. As a result, the duct is pressurized and discharges air under pressure into the spaces between adjacent pairs of the vanes and toward the outlet portion of the housing to expel material from the regions between the vanes at the housing outlet.

The rotatable members and the intervening vanes associated therewith are preferably fabricated of single piece construction, e.g. as a casting. One of the rotatable members is preferably so constructed that it can be directly coupled to an appropriate driving source for rotating the wheel. The structure is further provided with insert portions of comparatively low friction material to assure that the aforementioned elastic tubular member rotates, and flexes radially, without excessive wear. The sluice can also be provided with a further compressed air inlet adapted to pressurize the interior of the elastic tubular member, to assist in effecting a sealing engagement between said tubular member and the roots of the vanes as well as between said tubular member and the wall of the compressed air duct remote from the housing outlet.

BRIEF DESCRIPTION OF THE DRAWINGS

The foregoing objects, advantages, construction and operation of the present invention will become more readily apparent from the following description and accompanying drawings wherein:

FIG. 1 is a cross-sectional view of a bucket wheel sluice constructed in accordance with the present invention; and FIG. 2 is a longitudinal cross-section of the sluice shown in FIG. 1.

DESCRIPTION OF THE PREFERRED EMBODIMENT

As shown in the drawings, the bucket wheel sluice of the present invention comprises a housing 1 which rotatably supports a sluice wheel 2 for rotation between a material inlet 3 and a material discharge 4. The sluice wheel 2 includes a plurality of elongated vanes 5 which are disposed in generally parallel relation to one another and parallel to the axis of rotation of the wheel, with each of said vanes 5 having a radial extent which comprises a comparatively small fraction of the overall diameter of the sluice wheel. The tips of the vanes glide tightly across the partial circular walls 6, 7 of the housing, which walls define a cylindrical or partially cylindrical chamber between inlet 3 and outlet 4 in which the sluice wheel 2 rotates.

The several vanes 5 have cross-sections of truncated conical configuration so that the regions therebetween widen outwardly in V-shape; and these inter-vane regions cooperate with an elastic tubular member 18 which has an outer diameter equal to or greater than the inner diameter of the sluice wheel 2 at the vane roots, to sealingly engage the vane roots, and to bridge the spaces between adjacent ones of said vanes at their roots, thereby to form a plurality of generally V-shaped pockets which are adapted to receive material at inlet 3 and, by rotation of the wheel 2, are adapted to transport said material to the discharge side 4 of the housing.

As best shown in FIG. 2, the elongated vanes 5 are connected at one end to a disc 10, and they are connected at their other end to a ring bearing 15. Disc 10, vanes 5, and ring bearing 15 are preferably of single-piece construction, e.g. a unitary casting, and form a structure of cage configuration wherein the vanes are freely spaced from one another throughout their extent except for the interconnection therebetween provided by disc 10 and ring bearing 15. Disc 10 includes a bearing projection 11 which extends through and is sealed to the bore 12 of a housing cover plate 13 at one end of the device; and projection 11 is provided with a bore 14 on the axial center of the sluice wheel 2 for the reception of the drive shaft of a motor (not shown) having a gear box flange for rotating the sluice wheel 2.

The opposite end of the device is closed by a housing cover plate 17. The ring bearing 15 is disposed closely adjacent to cover plate 17 in engagement with an annular shoulder 16 thereon; and this portion of the cover plate is also preferably provided with an annular insert 23 fabricated of material having a low coefficient of friction, for purposes which will become apparent subsequently.

An elongated stationary compressed-air duct 20 is disposed adjacent the discharge side 4 of the housing. Duct 20 extends along the entire length of sluice wheel 2 and is interposed between the roots of the vanes 5 and elastic tubular member 18 adjacent housing discharge 4. The cross-sectional profile of duct 20 is best shown in FIG. 1 and takes the form of a segment of a circle. More particularly, the duct includes two opposing walls of differing curvature which meet one another at comparatively narrow elongated edges, for reasons which have been described earlier. Duct 20 is connected at one end thereof to the housing cover plate 17, or to the aforementioned insert 23 in said cover plate; and a fitting 21 adapted to be connected to a compressed air supply P is mounted on cover plate 17 at said one end of the duct 20 and includes a tubular portion 22 which extends into the interior of the duct 20 as illustrated in FIG. 2. The opposite end of the duct is closed by a plug 24. The wall of the duct which is directly adjacent to the roots of vanes 5 is, moreover, provided with a plurality of discharge apertures through which compressed air may pass from the interior of the duct into the region between the adjacent vanes 5l, to forcibly expel any material which is in said region as the vanes pass the discharge outlet 4 of housing 1.

Tubular member 18 rotates with sluice wheel 2 and, as best shown in FIG. 1, the outer side 9 of said tubular member is separated from the vane roots as it passes over one of the narrow edges of duct 20, thereafter glides across the rear wall of the compressed air duct in the region of housing discharge 4, and, after passing over the other elongated comparatively narrow edge of the duct 20, re-engages the roots of vanes 5 to re-establish the pockets for reception of additional material at housing inlet 3. To enhance this operation, a further compressed air fitting may be provided, e.g. in cover plate 17, which is positioned to pressurize the interior of tubular member 18 thereby to pneumatically press said tubular member 18 outwardly into forcible sealing engagement with the roots of vanes 5 and with the wall of duct 20 remote from housing discharge 4.

The shoulder 16 of housing cover plate 17 is provided, as described earlier, with an annular insert 23 having a low coefficient of friction. Insert 23 has a radial dimension which extends in inward direction across the edge of tubular member 18 in sealing engagement with said edge. The disc 10 is provided with a similar annular insert 25 fabricated of a material possessing a low coefficient of friction, which has radial dimensions corresponding to the dimensions of the insert 23, and which is in engagement with the opposite end of tubular member 18. These low friction inserts 23, 25 assure that the rotational and radial movements of tubular member 18 encounter only very minor resistance. In addition, these inserts provide for low frictional movement of disc 10 past plug 24 of duct 20.

As will be apparent from the foregoing discussion, the pockets 8 of the sluice wheel 2 are filled with material at the intake side 3 of housing 1. This material is carried along by the pockets as the sluice wheel 2 rotates and, as soon as the pockets 8 arrive at a position adjacent discharge 4 and adjacent compressed air duct 20, material present in the pockets is forcibly expelled therefrom by compressed air which flows into the region between adjacent vanes from the roots of the vanes toward discharge 4. The explusion of material is facilitated, moreover, by the fact that the pockets 8 widen conically outward. Since a large number of vane tips fit snuggly against the curved housing walls 6 and 7, moreover, it becomes readily possible to maintain a relatively large difference in pressure between intake side 3 and discharge side 4 of the housing.

The fastening of the compressed air duct is preferably effected at the insert 23 of the cover plate 17 by deforming the end of the duct which extends through insert 23. The sluice can be dismantled in simple fashion by merely removing housing cover plate 17, whereafter all components of the bucket wheel sluice can be pulled axially from the housing 1 for servicing.

While I have thus described a preferred embodiment of the present invention, many variations will be apparent to those skilled in the art. It must therefore be understood that the foregoing description is intended to be illustrative only and not limitative of the present invention; and all such variations and modifications as are in accord with the principles described are meant to fall within the scope of the appended claims.

Having thus described my invention, I claim:

1. A bucket wheel sluice comprising a housing defining an inlet portion and an outlet portion separated from one another by curved walls of circular segmental configuration, said walls partially bounding a chamber located between said inlet and outlet portions of said housing, a cylindrical sluice wheel mounted for rotation within said chamber in coaxial relation to said walls, said sluice wheel comprising a pair of rotatable members disposed adjacent the opposing ends of said chamber respectively in coaxial relation to said walls, a plurality of elongated parallel vanes extending between said rotatable members in parallel relation to the axis of rotation of said sluice wheel, the roots of said vanes being freely spaced from one another between said rotatable members, the tips of said vanes being located for movement closely adjacent to said curved walls of said housing and past said inlet and outlet portions of said housing as said wheel rotates, an elastic tubular member located between said rotatable members in coaxial relation to said sluice wheel, said elastic tubular member being positioned and dimensioned to resiliently engage the roots of said vanes and to bridge the spaces between the roots of adjacent ones of said vanes whereby each adjacent pair of said vanes and the intervening portion of said elastic tubular member form a pocket for the reception of material at said inlet portion of said housing and for transport of said material to said outlet portion of said housing, and pneumatic means for forcibly expelling such material from said pockets at the outlet portion of said housing, said pneumatic means comprising an elongated stationary duct extending substantially parallel to the axis of rotation of said sluice wheel and positioned adjacent the outlet portion of said housing between said elastic tubular member and the roots of said vanes, said tubular member flexing radially away from said vanes to pass over the side of said duct remote from the outlet portion of said housing as said tubular member and vanes rotate past said outlet portion of said housing, said duct including a plurality of apertures facing said vanes at the outlet portion of said housing, and means for supplying compressed air to said duct for discharge through said apertures into the spaces between adjacent pairs of said vanes and toward said outlet portion of said housing to expel material from the regions between said vanes.

2. The structure of claim 1 wherein said duct has a wall of substantially circular segmental configuration adjacent to the roots of said vanes, said apertures being disposed in said duct wall.

3. The structure of claim 1 including means closing one end of said elongated duct, said means for supplying compressed air including a compressed-air fitting at the other end of said duct.

4. The structure of claim 1 including a stationary cover closing one end of said chamber, one of said rotatable members comprising an annular bearing in engagement with a portion of said cover.

5. The structure of claim 4 wherein said portion of said cover is fabricated of a material having a low coefficient of friction.

6. The structure of claim 5 wherein one end of said tubular membler is in sealing engagement with said portion of said cover.

7. The structure of claim 6 including a further cover at the other end of said chamber, said further cover including a central opening, the other of said rotatable members comprising a disc having a central projection in bearing engagement with said further cover adjacent its said central opening, said projection including means for coupling said disc to an external drive to effect rotation of said sluice wheel.

8. The structure of claim 7 wherein said disc includes a portion fabricated of material having a low coefficient of friction, the other end of said tubular member being in engagement with said portion of said disc for radial sliding movement relative thereto during said flexing operation.

9. The structure of claim 1 wherein said rotatable members and said vanes are interconnected to one another in a single-piece construction.

10. The structure of claim 1 wherein each of said pockets has a generally V-shaped configuration widening outwardly toward the tips of said vanes.

11. The structure of claim 1 wherein each of said vanes has a truncated conical configuration in cross-section.

12. A bucket wheel sluice comprising a housing having an inlet and an outlet spaced from said inlet, a sluice wheel mounted for rotation within said housing between said inlet and outlet, said wheel comprising a plurality of elongated vanes extending in parallel relation to one another in directions generally parallel to the axis of rotation of said wheel, the roots of said vanes being freely spaced from one another, an elastic sealing means in resilient engagement with the roots of said vanes to cover the spaces between the roots of adjacent ones of said vanes and cooperating with said vanes to provide a plurality of pockets around said wheel adapted to receive material at said inlet and to deliver the same to said outlet as said wheel rotates, and means for forcibly expelling such material from said wheel at said outlet comprising a stationary duct interposed between the roots of said vanes and said elastic sealing means adjacent said outlet, said duct including apertures facing the roots of said vanes, and means for supplying a gas under pressure to said duct for discharge from said apertures into the spaces between said vanes at said outlet.

13. The structure of claim 12 wherein said gas under pressure is compressed air.

14. The structure of claim 12 wherein said elastic sealing means comprises a tube of resilient material surrounding the axis of rotation of said wheel and having an outside diameter which is at least as great as the inside diameter of said wheel at the roots of said vanes.

* * * * *